United States Patent
Hoenig

(10) Patent No.: US 10,355,562 B2
(45) Date of Patent: Jul. 16, 2019

(54) SLIP-RING ARRANGEMENT WITH SPIRAL FAN

(71) Applicant: Siemens Aktiengesellschaft, Munich (DE)

(72) Inventor: Christian Hoenig, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 60 days.

(21) Appl. No.: 15/567,137

(22) PCT Filed: Apr. 5, 2016

(86) PCT No.: PCT/EP2016/057414
§ 371 (c)(1),
(2) Date: Oct. 17, 2017

(87) PCT Pub. No.: WO2016/169763
PCT Pub. Date: Oct. 27, 2016

(65) Prior Publication Data
US 2018/0102693 A1    Apr. 12, 2018

(30) Foreign Application Priority Data

Apr. 24, 2015    (EP) .................................... 15164971

(51) Int. Cl.
*H01R 39/08*    (2006.01)
*H02K 9/28*    (2006.01)
(Continued)

(52) U.S. Cl.
CPC ............. *H02K 9/28* (2013.01); *H02K 13/003* (2013.01); *H02K 5/141* (2013.01)

(58) Field of Classification Search
CPC ...... H02K 9/28; H02K 13/003; H02K 13/006; H02K 5/141
(Continued)

(56) References Cited

U.S. PATENT DOCUMENTS 2,451,219 A * 10/1948 Holmgren ............... H02K 9/005
                                                    310/58
2,811,107 A * 10/1957 Brill ....................... H02K 5/1282
                                                    310/11
(Continued)

FOREIGN PATENT DOCUMENTS

CN        102624156 A      8/2012
DE     102012203098 A1     4/2013
(Continued)

OTHER PUBLICATIONS

EP Search Report and Opinion dated Dec. 22, 2015, for EP patent application No. 15164971.2.
(Continued)

*Primary Examiner* — Thanh Lam
(74) *Attorney, Agent, or Firm* — Beusse Wolter Sanks & Maire

(57) ABSTRACT

A slip-ring arrangement for an electrical rotary machine has a rotor and a sliding-contact device which is arranged on the rotor and has a slip ring, and a sliding-contact element with which the slip ring can make electrical contact. Furthermore, a radial fan impeller with an intake device is arranged on the rotor, wherein the intake device is designed in such a way that, during operation of the radial fan impeller, a cooling fluid can be drawn into the radial fan impeller through the intake device along the sliding-contact device. Furthermore, the slip-ring arrangement has a spiral housing which is of spiral design and surrounds a radial circumference of the radial fan impeller.

6 Claims, 4 Drawing Sheets

(51) Int. Cl.
*H02K 13/00* (2006.01)
*H02K 5/14* (2006.01)

(58) Field of Classification Search
USPC .............................. 310/232, 89, 52, 59, 62
See application file for complete search history.

(56) References Cited

U.S. PATENT DOCUMENTS

| | | | | |
|---|---|---|---|---|
| 5,329,199 | A | * | 7/1994 | Yockey .................. H02K 1/243 310/263 |
| 7,327,055 | B2 | * | 2/2008 | Devine .................. H02K 1/278 310/58 |
| 2007/0231130 | A1 | | 10/2007 | Hanazuka et al. |
| 2015/0054362 | A1 | * | 2/2015 | Bulatow ................ H01R 39/48 310/58 |

FOREIGN PATENT DOCUMENTS

| | | | |
|---|---|---|---|
| GB | 1294719 | A | 11/1972 |
| JP | 2007270631 | A | 10/2007 |
| JP | 2007321562 | A | 12/2007 |
| JP | 2011226718 | A | 11/2011 |

OTHER PUBLICATIONS

International Search Report dated Jun. 23, 2016, for PCT/EP2016/057414.

\* cited by examiner

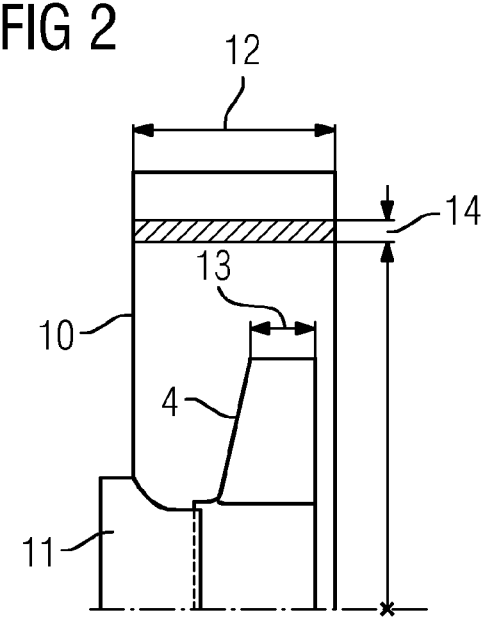
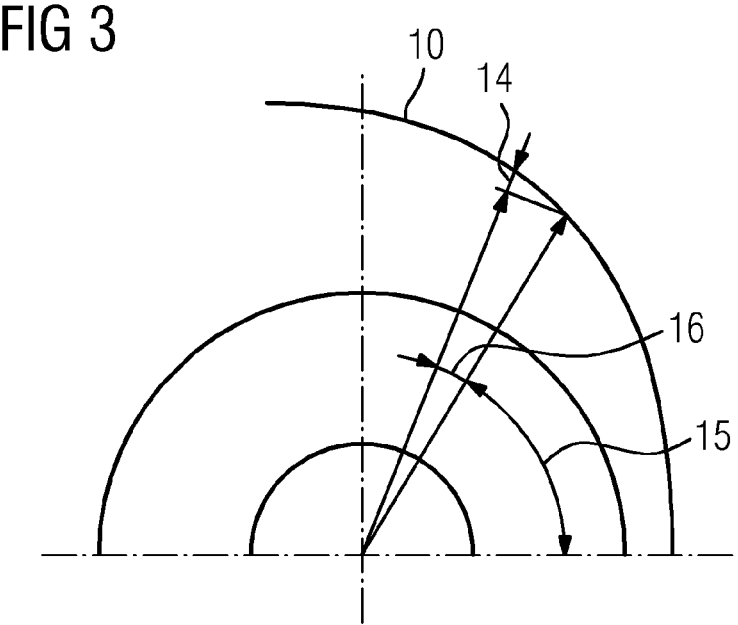

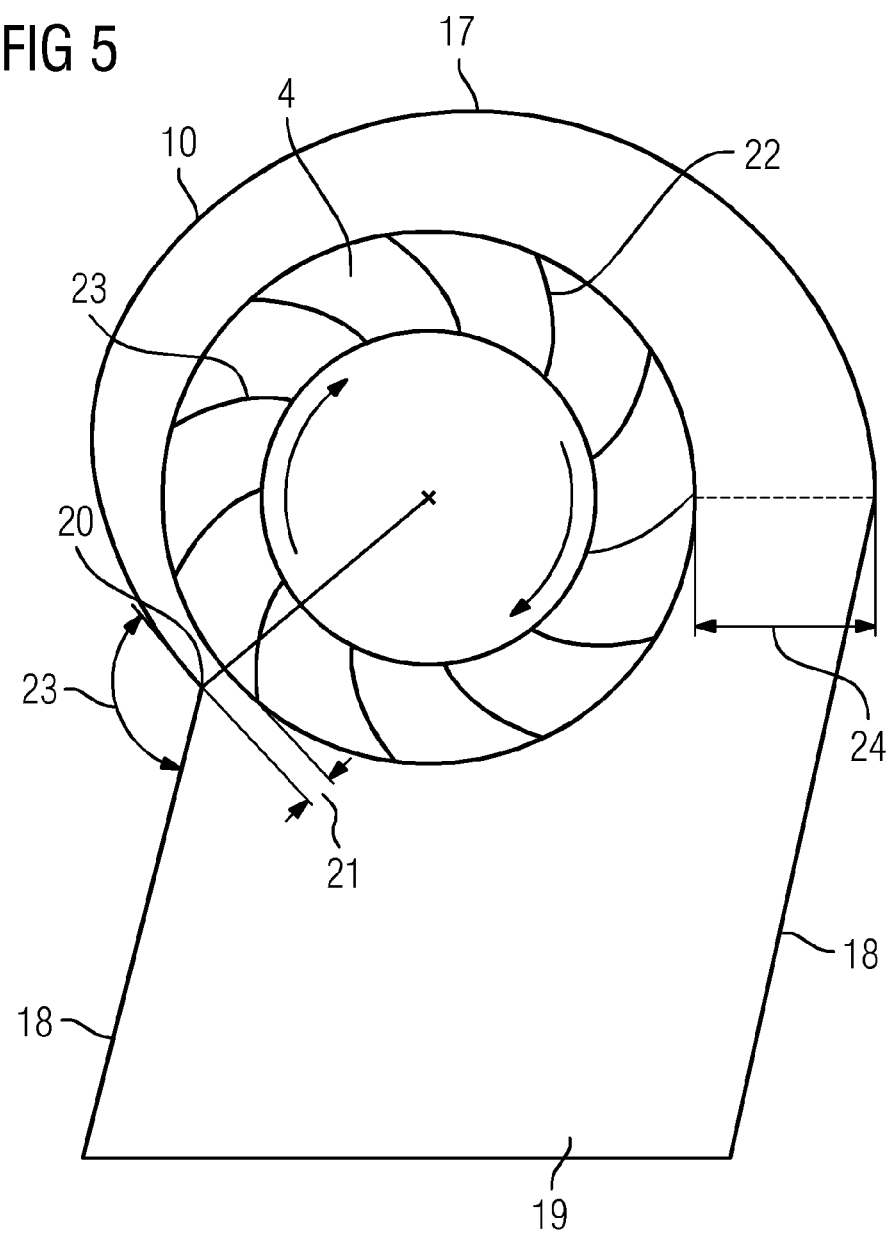

SLIP-RING ARRANGEMENT WITH SPIRAL FAN

CROSS REFERENCE TO RELATED APPLICATIONS

This application is the US National Stage of International Application No. PCT/EP2016/057414 filed Apr. 5, 2016, and claims the benefit thereof. The International Application claims the benefit of European Application No. EP15164971 filed Apr. 24, 2015. All of the applications are incorporated by reference herein in their entirety.

FIELD OF INVENTION

The invention relates to an electric rotary machine having a slip-ring arrangement such as, for example, a generator, in particular turbo generator, or motor. The invention also relates to a retrofitting kit for such an electric rotor machine.

BACKGROUND OF INVENTION

Slip-ring arrangements having a slip ring and a sliding-contact element, such as e.g. what is referred to as a brush, form a sliding contact or a brush bridge which permits electrical power or a signal to be transmitted between components which rotate with respect to one another. In particular, slip-ring arrangements can be used in generators, synchronous machines and turbo generators to feed the necessary exciter voltage from a static exciter device into exciter windings of the rotor by means of the sliding contacts of the slip-ring arrangement.

Such slip-ring arrangements have to be cooled in order to conduct away the temperatures which arise as a result of friction and current.

Furthermore, the mechanical friction on the sliding contact results in friction dust which has to be carried away, since otherwise it can adversely affect the functional capability of the sliding-contact device and, in particular, its electrical contact-forming properties.

SUMMARY OF INVENTION

An object of the invention is to specify an electric rotary machine having a slip-ring arrangement with improved operating properties, in particular lower susceptibility to faults and in increased service life.

This object is achieved by means of an electric rotary machine having a slip-ring arrangement for an electric rotary machine according to the independent patent claim.

An electric rotary machine having a slip-ring arrangement has a rotor, a sliding-contact device which is arranged on the rotor and having a slip ring and a sliding-contact element with which the slip ring can make electrical contact, and a radial impeller wheel which is arranged on the rotor and has an intake device, and the intake device is embodied in such a way that during the operation of the radial impeller wheel a cooling fluid can be drawn into the radial impeller wheel by the intake device along the sliding-contact device. Furthermore, the slip-ring arrangement has a spiral housing which is of spiral design and surrounds a radial circumference of the radial impeller wheel.

The electric rotary machine can be any desired electric machine such as, for example, a motor or a generator in which, for example, electrical power or a signal is to be transmitted from a stator to the rotor via the sliding-contact device. In particular, the rotary machine can be a turbo generator.

The sliding-contact device can form an electrical sliding contact between the slip ring and the sliding-contact element, by means of which contact electrical voltages or signals can be transmitted between the stator or the rotor.

The sliding-contact element is also referred to as a brush, carbon brush, slipping carbon or motor carbon. Its composition must be adapted to the requirements made of the contact and the power to be transmitted, and can vary. It can have graphite, enriched with metallic components such as e.g. copper, silver or molybdenum, or else only metallic components.

Material abrasion, which is referred to below as carbon dust irrespective of the composition of the material, occurs at the sliding-contact device, and, in particular, at the sliding-contact element as a result of friction and a strong generation of heat. This carbon dust can seriously impair the electrical properties of the sliding-contact device, with the result that the functionality and service life and overall the possibility of using a slip-ring arrangement can be adversely affected, in particular because of the stringent requirements made of the exciter current transmission in generators.

In order to generate a flow of cooling fluid and also to transport away the carbon dust, the radial impeller wheel which is arranged on the rotor is provided with the intake device. In particular, the intake device can be configured in such a way that a cooling fluid which is made available at the sliding-contact device, for example from a cooling fluid reservoir, is sucked in by the intake device in such a way that it is conducted along the sliding-contact device and flows past, in particular, in a region between the slip ring and the sliding-contact element, before it is expelled by the radial impeller wheel which is driven, for example, by the rotor.

In particular, the intake device can have an intake connector which essentially encloses the sliding-contact device which is arranged on the rotor and forms a duct to the radial impeller wheel. When the radial impeller wheel is rotated, e.g. by the rotor, the air which is located between the blades of the radial impeller wheel is conveyed outward by the centrifugal force, whit the result that suction occurs in the region of the intake device or the intake connector that can cause the cooling fluid to be conducted along the sliding-contact device.

In order to be able to effectively and selectively discharge the heated cooling fluid which is contaminated with the carbon dust, the arrangement has the spiral housing which has an inner wall which is arranged in a spiral shape on a sectional plane perpendicular to the rotational axis of the rotor.

The spiral-shaped arrangement of the inner wall permits the flow of cooling fluid which is contaminated with the carbon dust to be discharged essentially unimpeded through the spiral housing, wherein regions with large pressure differences within the spiral housing are avoided. As a result, eddying, flow back regions in which particle movements with different orientations occur in a small space, and dead flow regions with low flow speeds can be avoided.

It has become apparent that this has a particularly positive effect on the transporting away of the friction dust, since said friction dust easily forms clumps in the backflow regions and dead flow regions owing to its surface properties and charge properties and/or accumulates on the inner wall. Uniform flowing out of the cooling fluid which contains the friction dust is therefore brought about by the spiral-shaped configuration of the housing, as a result of which clumping and accumulation in the vicinity of the spiral housing can be avoided.

As a result, on the one hand the mass flow through the spiral housing and, on the other hand, the discharge of the friction dust can be improved. Maintenance intervals can be lengthened and the service life of the entire slip-ring arrangement is improved. At the same time, consistent electrical contact-forming properties can be achieved, which provides improved suitability of the slip-ring arrangement for use in high-power generators.

In one embodiment, the spiral housing has a spiral region and an outflow region which is arranged downstream of the spiral region and has an outflow opening, wherein in the spiral region an inner wall of the spiral housing is spaced apart from a rotational axis of the rotor in a way corresponding essentially to a spiral function.

The spiral function can become visible here, in particular if the spiral housing is cut open in a plane perpendicular to the rotational axis of the rotor. In this sectional plane, the inner wall of the spiral housing can form a curve which runs around the rotational axis of the rotor and extends continuously away from the rotational axis. The spiral function can merely be simulated here as a worm line of a mathematically described spiral function or can correspond entirely or partially to a, for example, mathematical spiral function.

The spiral function can be embodied, for example, in the manner of a Archimedes screw, by which means the distance between the inner wall and the rotational axis can increase essentially proportionately to the rotational angle and therefore to a circumferential section of the radial impeller wheel. As a result, cooling fluid which is blown out at the circumference of the radial impeller wheel can be effectively transported away through the housing region which widens in a manner according to Archimedes, wherein high-pressure regions are avoided.

As an alternative to this, the spiral function can be defined by an approximated consideration of the path of a current filament and/or particle of friction dust, which results according to differential geometric considerations in a logarithmic spiral function in which radial lines through the rotational axis intersect the inner wall at a constant tangential angle. With such an arrangement of the inner wall, current filaments and therefore also the particles of friction dust which are mixed with the cooling fluid are conducted out of the spiral region essentially unimpeded and avoiding high-pressure regions. This assists the effective conveying away of the particles of friction duct and prevents accumulation of the particles on the inner wall.

Further spiral configurations are also possible, such as for example an arrangement of the inner wall as a hyperbolic spiral or as partial spiral definition.

The outflow region which is arranged downstream of the spiral region can ensure, for example in the manner of an outflow connector, selective conduction away of the cooling fluid and of the friction dust which is mixed therewith.

In one embodiment, in the outflow region the size of the cross-sectional area is constant in the direction of flow. In particular, the inner walls which laterally bound the outflow region in a sectional plane perpendicular to the rotational axis of the rotor can be arranged parallel to one another, at least partially or in the entire outflow region.

The cross-sectional area of the outflow region which is constant in the direction of flow permits the cooling fluid which is contaminated with the friction dust to flow away through the outflow region at a constant pressure, with the result that regions of relatively high pressure and eddying, for example at the inner wall in the outflow region, are avoided. There is a uniform flow through the outflow connector, which reduces the formation of accumulations of friction dust and at the same time improves the erosion of any accumulations. Soiling of the spiral housing is therefore effectively prevented or counteracted.

In one variant, in a junction region between the spiral region and the outflow region a tongue is formed by the inner wall in such a way that on the tongue, in a sectional plane perpendicular to the rotational axis, there is a tongue gap between the inner wall and an outer circumference of the radial impeller wheel, which tongue gap is the minimum distance between the inner wall and the outer circumference of the radial impeller wheel.

The tongue therefore forms in the adjoining region between the spiral region and the outflow region a type of bend or fold of the inner wall. This results in a projection, at the tip of which a location of minimum distance between the inner wall and the circumference of the radial impeller wheel is located. The tongue gap corresponds to the distance, measured radially from the rotational axis of the shaft, between the outer circumference of the radial impeller wheel and the inner wall at the tip of the tongue.

The tongue therefore forms a narrow gap between the inner wall and the circumference of the radial impeller wheel. This makes it possible to avoid cooling fluid which has already been conveyed out of the radial impeller wheel and contains friction dust passing, by virtue of its swirl, out of the outflow region and into the spiral region again. In particular, particles of friction dust which have already been conducted out of the spiral region into the outflow region are essentially prevented from entering the spiral region again by the tongue.

Since such particles have already been slowed down by being guided in the spiral region to the outflow region, their re-entry into the spiral region would make their accumulation on the inner wall probable. The tongue therefore effectively prevents the accumulations of friction dust in the spiral region.

In one embodiment, the tongue gap is smaller than half a radial extent of blades of the radial impeller wheel.

This avoids a situation in which the cooling fluid which contains friction dust, and has already been discharged into the outflow region from the spiral region, re-enters the spiral region, and further accumulation is therefore countered.

In a further embodiment, in the spiral region a maximum value of a distance between the outer circumference of the radial impeller wheel and the inner wall, said gap measured proceeding radially from the rotational axis of the rotor, corresponds to six times to eight times the tongue gap.

Such a configuration of the spiral region brings about sufficient widening of the region between the radial outlet edge of the radial impeller wheel and the inner wall in a direction of movement of the blades of the radial impeller wheel. This permits the cooling fluid which contains the friction dust to be effectively transported away from the region of the tongue to the region of the maximum value by the blades of the impeller wheel as they rotate. This avoids pressure differences, prompts uniform flowing out of the contaminated cooling fluid and counteracts accumulation.

In a further embodiment, the tongue is dull angled. In particular, a tangential face of the inner wall can enclose an obtuse outer angle with respect to the rotational axis in the spiral region with a tangential face of the inner wall in the outflow region, in the region of the tongue or the tongue tip.

The obtusely angled embodiment of the tongue avoids regions with relatively large pressure differences even better, which counteracts the production of backflow regions and the formation of dead flow regions which have a high risk of accumulation of the friction dust.

In a further embodiment, the tongue encloses an angle between 110° and 130°.

In test series such an angle has proven suitable for counteracting, on the one hand, renewed entry of the cooling fluid which contains the friction dust and has already been conducted into the outflow region, into the spiral region and, on the other hand, for avoiding the formation of flow regions with high pressure differences which can cause the formation of back flow regions and/or dead flow regions.

A retrofitting kit for a slip-ring arrangement having the features mentioned above has, in particular, the spiral housing.

The spiral housing has here, in particular, individual features or all the features as described above. Said spiral housing can additionally be configured in such a way that it can be arranged with only little mounting expenditure on an existing slip-ring arrangement.

The provision of a retrofitting kit with a spiral housing makes it possible to equip existing slip-ring arrangements, for example in turbo generators, with a slip-ring arrangement according to the invention. As a result, all that is necessary is to replace an impeller housing which is, under certain circumstances, located in the slip-ring set, with the spiral housing. The spiral housing has to be suitably dimensioned in order to be able to attach it to the rotor and arrange it on or around the radial impeller wheel.

Impeller housings which are more susceptible to becoming blocked can be replaced by the spiral housing according to the invention using the retrofitting kit. As a result, accumulation of friction dust is avoided, the sliding-contact device can be effectively cooled, and the service life and reliability of the slip-ring arrangement can be improved.

BRIEF DESCRIPTION OF THE DRAWINGS

The properties, features and advantages of this invention as described above and the way in which they are achieved become clearer and more easily understandable in conjunction with the following description of the exemplary embodiments which are explained in more detail in conjunction with the drawings, in which:

FIG. 2 shows a sectional view, illustrated from one side, through a spiral housing with a radial impeller wheel, FIG. 3 shows a method for determining parameters for the spiral housing from FIG. 2, FIG. 5 shows a section perpendicularly with respect to the rotational axis through a further spiral housing with a radial impeller wheel.

DETAILED DESCRIPTION OF INVENTION

Figure 1:
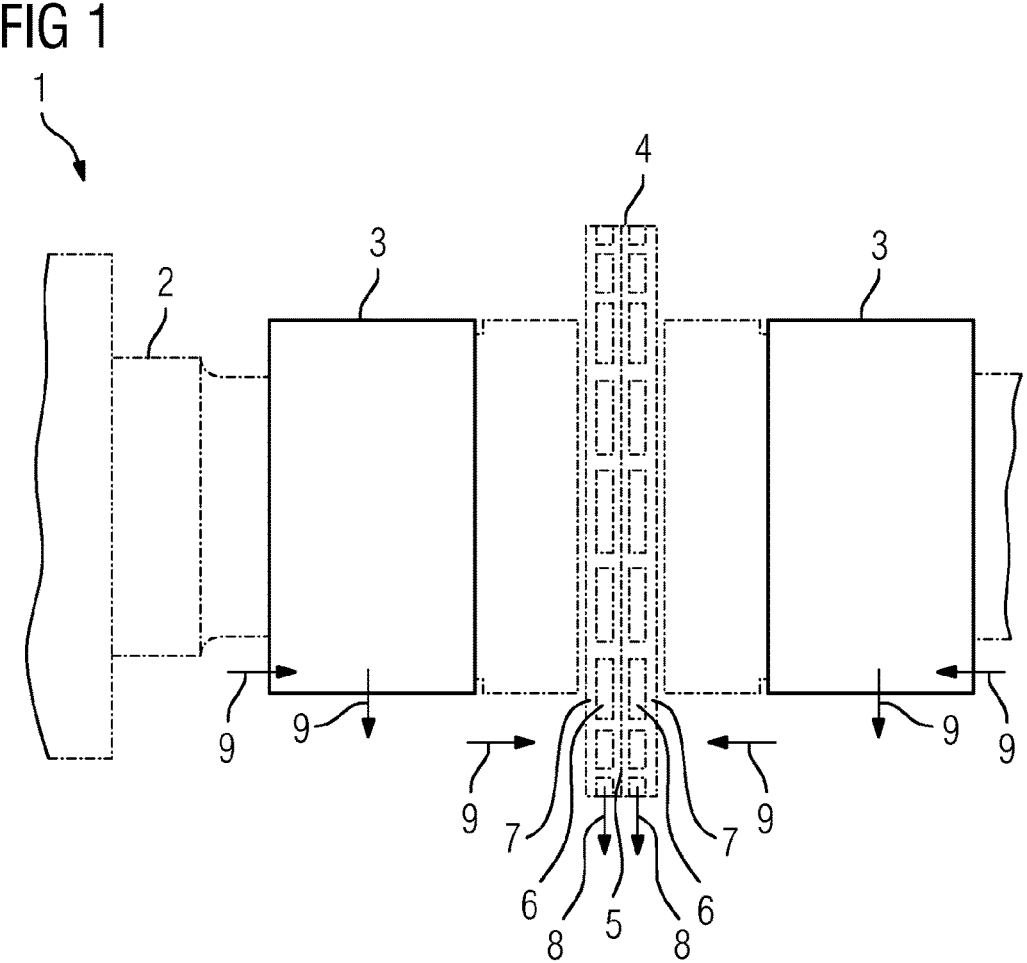
FIG. 1 shows a slip-ring arrangement for an electric rotary machine with a schematically illustrated cooling fluid flow.

FIG. 1 is a schematic view of a slip-ring arrangement 1 which is arranged on a rotor 2 of an electric rotary machine, for example of a generator, turbo generator or motor. Arranged on the rotor 2, configured in the manner of a shaft in the region of the slip-ring arrangement, are two sliding-contact devices 3 in such a way that a slip ring of the sliding-contact device 3 is connected in a rotationally fixed fashion to the rotor, while a sliding-contact element such as e.g. a carbon brush is arranged on a stator of the rotary machine and is coupled electrically thereto. The slip ring and sliding-contact element are arranged with respect to one another here in such a way that when the slip ring rotates with the rotor the slip ring can be placed in contact cyclically with the sliding-contact element, with the result an electrical contact can be formed in the manner of brush bridge.

A radial impeller wheel 4, which can be connected to the rotor 2 in a rotationally fixed fashion or via a transmission, is arranged between the sliding-contact devices 3. The radial impeller wheel 4 can have, for example, a center plate 5, on each side of which a blade plate 6 with a small radial circumference and blades which are arranged on the outside of the circumference are arranged, on each side of which cover plates 7 with a radius essentially corresponding to that of the center plate 5 can in turn be arranged. The blades can have a radial extent corresponding to the radius of the center plate 5 or cover plates 7. Cutouts which extend radially into the region of the blades and which therefore form a lateral inlet into the blade region of the radial impeller wheel 4 can be provided concentrically with respect to the rotational axis in the cover plates 7.

During operation of the rotary machine, the rotor 2 is made to rotate. As a result, the cyclical slip contact between the slip ring and the sliding-contact element is brought about at the sliding-contact devices 3. At the same time, the radial impeller wheel 4 is made to rotate, wherein a fluid which is located in the blade space is conducted radially towards the outside, as is illustrated by the cooling fluid flow 8. As a result, suction is brought about into the blade space, which suction causes a fluid to be taken in laterally through the cutouts in the cover plates 7 of the radial impeller wheel 4.

The suction can be used to suck a cooling fluid, made available in the region of the sliding-contact devices 3, through the sliding-contact devices 3 and, in particular, along the slip ring and the sliding-contact element into the radial impeller wheel 4 by means of an intake device which is embodied in the manner of an intake connector which encloses the sliding-contact devices 3 and leads to the cutouts in the cover plates 7 of the radial impeller wheel 4, as indicated by the cooling fluid flow 9. This permits, on the one hand, the sliding-contact devices 3 to be effectively cooled and, on the other hand, allows friction dust which has been removed from the sliding-contact element and/or the slip ring as a result of the sliding contact to be conveyed out of the sliding-contact device 3 and the entire slip-ring arrangement 1.

In order to remove the heated cooling fluid which contains the friction duct selectively and effectively from slip-ring arrangement 1, a housing which encloses the radial impeller wheel 4 can be arranged on the outside of an external radial circumference of the radial impeller wheel 4, the design of which housing can be implemented according to FIGS. 2 and 3.

FIG. 2 is a schematic view of one side of a sectional view through an arrangement of a spiral housing 10 on a radial impeller wheel 4. To the side of the radial impeller wheel 4, an intake connector 11 for conducting a cooling fluid into an interior of the radial impeller wheel 4 leads to the radial impeller wheel 4.

In one configuration of the spiral housing 10, its width 12 can be selected to be greater than a width 13 of the radial impeller wheel 4 at its external circumference. A radial increase 14 can, as becomes clear from a combination of FIG. 2 and FIG. 3, be determined as a function of a circumferential angle 15 and, in particular, as a function of an increase in the angle 16.

If an embodiment of the spiral housing 10 corresponding to a current filament line, calculated on the assumption of a constant swirl of a cooling fluid particle or particle of friction dust is aimed at here, this may result, for example, in a configuration of an inner wall of the spiral housing 10 in the form of a logarithmic spiral.

Figure 4:
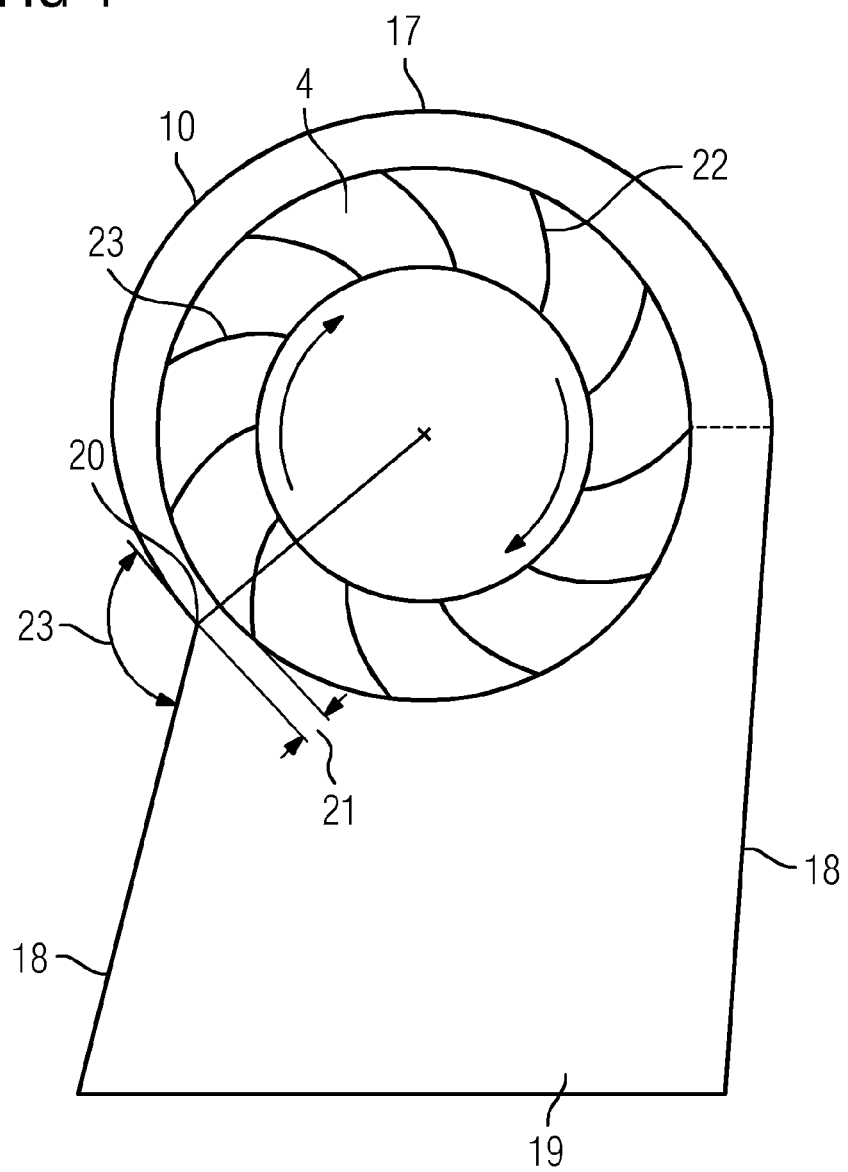
FIG. 4 shows a section perpendicularly with respect to a rotational axis through a spiral housing with a radial impeller wheel.

FIG. 4 shows a spiral housing 10 with a radial impeller wheel 4 which is arranged therein, with the rotational direction indicated. The spiral housing 10 has a spiral region 17 in which an inner wall of the spiral housing 10 is spaced apart from a rotational axis of the rotor 2, and therefore also from an external circumference of the radial impeller wheel 4, essentially in accordance with a spiral function. As a result of the spiral arrangement of the inner wall of the spiral housing 10, the free space between the external circumference of the radial impeller wheel 4 and the inner wall of the spiral housing 10 widens downstream, with the result that a flow of cooling fluid which is expelled by the radial impeller wheel 4 and contains the friction duct can be carried away effectively through the spiral region 17 into an outflow region 18 of the spiral housing 10. The distance, which increases in the direction of flow, between the inner wall of the spiral housing 10 and the external circumference of the radial impeller wheel 4 makes it possible for the cooling fluid to be carried away with the particles of friction dust in such a way that regions of a high pressure and large pressure differences in the spiral region 17 are avoided. Backflow regions or dead flow regions in which the friction dust could accumulate on the housing are therefore largely avoided.

Downstream of the spiral region 17, the cooling fluid which contains the friction dust is conducted through the outflow region 18 to an outflow opening 19 where it is discharged from the spiral housing 10.

In a junction region between the spiral region 17 and the outflow region 18 the inner wall of the spiral housing 10 forms a tongue 20 in such a way that at the tongue a tongue gap 21 between the inner wall of the spiral housing 10 and an external circumference of the radial impeller wheel 4 is at a minimum, that is to say the minimum radial distance between the inner wall of the spiral housing 10 and the external circumference of the radial impeller wheel 4 is assumed in the tongue region. The tongue region forms a projection into the interior of the spiral housing 10. In particular, in the example shown the tongue gap 21 is smaller than half a radial extent of blades 22 of the radial impeller wheel 4.

This ensures that the outflow region 18 is connected to the spiral region only by a narrow gap in front of the tongue 20. As a result, flow regions with different directions of flow, such as can be formed, on the one hand, in the spiral region, and, on the other hand, downstream thereof in the outflow region, are essentially separated from one another. A main direction of flow is therefore defined in each region of the spiral housing 10.

As a result, it is possible to prevent the occurrence of backflow regions and dead flow regions, which improves the throughflow rate and at the same time prevents accumulation of friction dust on the inner wall of the spiral housing 10.

Furthermore, in the exemplary embodiment shown the tongue 20 is embodied with an obtuse angle, since, adjacent to the tongue 20 in the spiral region 17, a tangential face of the inner wall encloses an obtuse outer angle 23 with a tangential face of the inner wall in the outflow region 18 adjacent to the tongue 20. In particular in the example shown, the tongue 20 can have an outer angle 23 between 110° and 130°, since this region has proven particularly favorable for avoiding accumulations of friction dust on the tongue 20. As a result, pressure peaks in the region of the tongue 20 can be avoided and accumulations of particles of friction dust can be reduced.

FIG. 5 shows a further example of a spiral housing 10 with a radial impeller wheel 4 arranged therein, in which example a size of the cross-sectional face in the direction of flow is constant in the outflow region 18. This can be achieved with a constant height of the outflow region 18 in the direction of the rotational axis of the radial impeller wheel by means of essentially parallel guidance of the sections of the inner wall of the spiral housing 10 which lie opposite one another.

The cross-sectional face which is constant in the direction of flow makes it possible to obtain, in the outflow region 18, a uniform flow behavior in which large pressure differences and therefore eddying and backflow regions and dead flow regions can be avoided or reduced. As a result, accumulations of friction dust are essentially avoided.

Furthermore, a maximum value 24 of the distance, measured proceeding radially from the rotational axis, between the outer circumference of the radial impeller wheel 4 and the inner wall of the spiral housing 10 corresponds to six times to eight times the tongue gap 21. This provides a configuration of the spiral region 17 that permits the cooling fluid which contains friction dust to flow away uniformly from the radial impeller wheel 4 into the spiral region 17 and from there into the outflow region 18. This avoids accumulations of friction dust on the inner wall of the spiral housing 10.

Accordingly, the spiral-shaped housing geometry improves the removal of friction dust and avoids accumulations of the friction dust, permitting improved usability and an extended service life of the entire slip-ring arrangement, in particular on electric rotary machines with high-power requirements.

Although the invention has been illustrated and described in greater detail by means of the preferred exemplary embodiment, the invention is not limited by the disclosed examples, and other variations can be derived therefrom by a person skilled in the art without departing from the scope of protection of the invention.

The invention claimed is:

1. An electric rotary machine having a slip-ring arrangement, comprising:
   a rotor,
   a sliding-contact device which is arranged on the rotor and having a slip ring and a sliding-contact element with which the slip ring makes electrical contact,
   a radial impeller wheel which is arranged on the rotor and has an intake device, and the intake device is embodied in such a way that during the operation of the radial impeller wheel a cooling fluid is drawn into the radial impeller wheel by the intake device along the sliding-contact device, and
   a spiral housing which is of spiral design and surrounds a radial circumference of the radial impeller wheel,
   wherein the spiral housing has a spiral region and an outflow region which is arranged downstream of the spiral region and has an outflow opening,
   wherein in the spiral region an inner wall of the spiral housing is spaced apart from a rotational axis of the rotor in a way corresponding essentially to a spiral function,
   wherein in a junction region between the spiral region and the outflow region a tongue is formed by the inner wall in such a way that on the tongue, in a sectional plane perpendicular to the rotational axis, there is a tongue gap between the inner wall and an outer circumference of the radial impeller wheel, which tongue gap is the minimum distance between the inner wall and the outer circumference of the radial impeller wheel, wherein in the spiral region a maximum value of a distance between the outer circumference of the radial impeller wheel and the inner wall, said gap measured proceeding radially from the rotational axis of the rotor, corresponds to six times to eight times the tongue gap.

2. The slip-ring arrangement as claimed in claim 1, wherein in the outflow region the size of the cross-sectional area is constant in the direction of flow.

3. The electric rotary machine as claimed in claim 1, wherein the tongue gap is smaller than half a radial extent of blades of the radial impeller wheel.

4. The electric rotary machine as claimed in claim 1, wherein the tongue is dull angled.

5. The electric rotary machine as claimed in claim 1, wherein the tongue has an angle between 110° and 130°.

6. A retrofitting kit for an electric rotary machine as claimed in claim 1 comprising:

the spiral housing.

\* \* \* \* \*